US011624931B2

(12) United States Patent
Nguyen et al.

(10) Patent No.: US 11,624,931 B2
(45) Date of Patent: Apr. 11, 2023

(54) MONOLITHIC TRANSMITTING SPECTRAL BEAM COMBINER

(71) Applicant: Lawrence Livermore National Security, LLC., Livermore, CA (US)

(72) Inventors: Hoang T. Nguyen, Livermore, CA (US); Michael C. Rushford, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 454 days.

(21) Appl. No.: 16/699,014

(22) Filed: Nov. 28, 2019

(65) Prior Publication Data

US 2020/0174265 A1 Jun. 4, 2020

Related U.S. Application Data

(60) Provisional application No. 62/774,694, filed on Dec. 3, 2018, provisional application No. 62/821,653, filed on Mar. 21, 2019.

(51) Int. Cl.
*G02B 27/10* (2006.01)
*G02B 27/14* (2006.01)
*H01S 3/06* (2006.01)

(52) U.S. Cl.
CPC ....... *G02B 27/1013* (2013.01); *G02B 27/148* (2013.01); *H01S 3/0627* (2013.01)

(58) Field of Classification Search
CPC ........... G02B 27/1006; G02B 27/1013; G02B 27/1086; G02B 27/148; G02B 5/1866; H01S 3/0014; H01S 3/005; H01S 3/0071; H01S 3/0627; H01S 3/2391
See application file for complete search history.

(56) References Cited

U.S. PATENT DOCUMENTS

| | | | | |
|---|---|---|---|---|
| 6,275,630 B1* | 8/2001 | Yang | .................... | G02B 6/2938 385/35 |
| 2003/0215182 A1* | 11/2003 | Lin | .................... | G02B 6/29394 385/37 |
| 2006/0153023 A1* | 7/2006 | Hikichi | ................ | G02B 5/1871 369/44.23 |
| 2009/0034906 A1* | 2/2009 | Tan | ......................... | G02B 6/43 385/44 |

\* cited by examiner

*Primary Examiner* — Joseph P Martinez
*Assistant Examiner* — Vipin Patel
(74) *Attorney, Agent, or Firm* — Knobbe, Martens, Olson & Bear, LLP

(57) ABSTRACT

A device utilized for spectrally combining multi lasers or laser emitters into a single high-power beam. Exemplary embodiments of the device consist of a monolithic structure, such as a hollow tube, wherein the input end cap comprises a transform optic and the output end cap comprises a transmission grating.

34 Claims, 16 Drawing Sheets

| Motivation | MOSPEC | Reflective Grating |
|---|---|---|
| Laser Damage Threshold | 10000 kw/cm² | 500 kw/cm² |
| Monolithic Assembly | Small and Compact | Not possible |
| Sealable Assembly | Yes | Not possible |
| Input Beam Offset | In-Plane | Out-of-Plane |
| Complex Thin Film Stack | None | Yes |
| Transform Optic Focal Length | 2000 mm | 2000 mm |
| Distance of Transform Optic to Grating | 200 mm | 2000 mm |
| Transform Optics Geometry | Round | Rectangular, 2:1 |
| Volume | 1/7 unit | 1 unit |
| Weight | 1/3 unit | 1 unit |
| Cost | 1/10 units | 1 unit |
| Absorption Coefficient _alpha_ | SiO2@1064nm 0.000085/m | Si@1070nm 1000/m |
| Flux entering substrate _p_ | 1 | 1.50E-04 |
| Specific Heat _Cp_ | 703 [J/(kg·K)] SiO2 | 700[J/kg.K] Si |
| Density _rho_ | 2203 [kg/m^3] SiO2 | 2329 [kg/m^3] Si |
| Ratio Temps alpha*p/(Cp*rho) | 1 | 0.9 |
| Expansion coefficient | 0.00000055 SiO2 | 0.0000026 Si |
| Wavefront Distortions per surface | 0.5 | 2 |
| Grating Rotation Diffraction Angle Sensitivity | NONE | 2 |

FIG. 2

MONOLITHIC TRANSMITTING SPECTRAL BEAM COMBINER

CROSS-REFERENCE TO RELATED APPLICATIONS

This application claims the benefit of U.S. Provisional Patent Application No. 62/774,694 titled "Monolithic Transmitting Spectral Beam Combiner," filed Dec. 3, 2018, incorporated herein by reference. This application claims the benefit of U.S. Provisional Patent Application No. 62/821,653 titled "Monolithic Transmitting Spectral Beam Combiner," filed Mar. 21, 2019, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United State Department of Energy and Lawrence Livermore National Security, LLC, for the operation of Lawrence Livermore National Laboratory.

BACKGROUND OF THE INVENTION

Field of the Invention

The present invention relates to spectral beam combining, and more specifically, it relates to the use of a transmission grating in a spectral beam combining apparatus and method.

Description of Related Art

Spectral Beam Combining (SBC) is a technique that spatially and directionally overlays the outputs of multiple lasers and or laser emitters operating at specific wavelengths into a single beam. SBC is achieved when beams with non-overlapping optical spectra are combined by wavelength-sensitive beam combiners.

Combination is possible because each beam is distinguishable via its unique wavelength. By picking the wavelengths of each beam correctly, the beams emerge on the opposite side of the beam combining optic in a single beam where all of the input beams have been made co-linear. There are no fill factor losses (each beam is perfectly overlapped spatially). If each input beam is diffraction limited and high-quality optics are used, the combined output beam also will be diffraction limited. The spectral content of the combined beams will cover the bandwidth range of the input beams. Thus, SBC provides diffraction-limited output, but the combined beam contains many wavelengths. Each wavelength source must have a very narrow bandwidth and an equally small wavelength drift. In order to achieve high-density combining of many individual lasers, a combining element with high resolving power, such as a diffraction grating, is required.

The industrial standard SBC configuration utilizes a reflective multi-layer dielectric (MLD) diffraction grating as the dispersive beam combining optical component as shown in FIG. 1 which shows three fiber sources (2,4,6) each directing a beam onto lens 8 and then onto reflective grating 10. This configuration has numerous limitations, such as:

1. Requires long optical path lengths. For high efficiency performance, the reflective beam combiner is required to be oriented at the Littrow angle for the desired central wavelength, where input beam and output laser beams are at the identical angle, only separated by a very small vertical angle offset, typically less than 4 degrees. Separating the input and output beam for this configuration requires a long optical path.

2. Vertical angle offset creates a "conical mount" configuration where the incoming beams are not normal to the diffraction grating grooves. This "out of plane" geometry causes an undesired change in grating spacing that needs to be compensated for by placing each wavelength fiber source at adjacent points along a conical arc segment "smile".

3. Alignment sensitive. Because of the long optical path lengths and since reflection surface angular changes are magnified 2× on the beam leaving the mirror like-grating lines, the optics components are typically free-space, thus the alignment of these system are very sensitive and difficult to make mechanically robust.

Thus, FIG. 1 illustrates prior art spectral beam combining achieved when beams with non-overlapping optical spectra are combined by wavelength-sensitive beam combiners such as a reflection grating. The three beams are provided from different sources where each one has a different wavelength and are located on points of a closely packed array off fibers positioned along an arc to compensate for a conically mounted grating. There is a large spacing between the beams on the lens, which must be located far enough from the grating to minimize the Littrow condition. The reflected diffraction efficiency is reduced when the system is aligned off of the Littrow condition for the conical mounted configuration.

SUMMARY OF THE INVENTION

We describe a novel device utilized for spectrally combining multi lasers or laser emitters into a single high-power beam. Our device consists of a monolithic structure, such as a hollow tube, where in the input end cap consist of a transform optic and the output end cap consist of a transmission grating.

The present invention, sometimes referred to herein as the Monolithic Transmitting Spectral Beam Combiner (MOSPEC) device has numerous significant advantages over the tradition reflectance combining optical elements, such as:

1. It is significantly more compact.
2. Transmission grating diffraction angle is invariant to incident angle unlike reflection gratings, https://ibsen.com/technology-2/why-are-transmissioni-gratings-less-angle-sensitive-than-reflection-gratings/
3. The monolithic configuration is less sensitive to misalignment, can be sealed to minimize environmental contamination (no critical surfaces are expose to external environment), and can be potential self thermally compensating.
4. It has an in-plane configuration—no need to compensate for a change in grating spacing, Fiber sources are packed side by side along a straight line.
5. Extremely high laser damage thresholds are sustainable—it can be made 100% from bulk fused silica material, no thin film is needed.

FIG. 2 provides some comparisons of the use of the transmission grating of the present invention for spectral beam combining versus using a reflection grating configuration. The present monolithic assembled transmission grating spectral beam combiner offers several advantages over reflection grating spectral beam combiner. For example, transmission designs have less volume and weight. They can accommodate at least 20× more fluence due to the use of bulk $SiO_2$ material without thin film coatings. The transform lens can be round and can be close to the grating where beams come to overlap at the grating. Fiber launch points for each wavelength can be arranged along linear spacing without the conical "smile" needed in reflection grating designs. The present invention can cost less than conventional designs. A targeting scope is colinear with the output beam path working at half the beam wavelength (which transmits through the transmission grating) which is not possible with reflection grating designs.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 2 provides some comparisons of the use of the transmission grating of the present invention for spectral beam combining versus using a reflection grating configuration.

DETAILED DESCRIPTION OF THE INVENTION

The present device consists of a monolithic structure, such as a hollow tube, where in the input end cap consist of a transform optic and the output end cap consist of a transmission grating.

This monolithic spectral beam combiner device has numerous significant advantages over the tradition reflectance combining optical elements, such as:
1. It is significantly more compact.
2. The monolithic configuration is less sensitive to misalignment, can be sealed to minimize environmental contamination (no critical surfaces are expose to external environment) and can be self thermally compensating.
3. It can have an in-plane configuration—no need to compensate for change in grating spacing.
4. Extremely high laser damage threshold is available. It can be made 100% from bulk fused silica material and no thin film is needed.
5. To minimize the Fresnel reflection losses, both the input and output surfaces can utilize bulk microstructure features.
6. The bulk transmission grating design can be polarization insensitive for wavelengths from 1025 nm to 1085 nm with theoretical diffraction efficiency >99%. Transmission grating parameters are a period >900 nm and <1200 nm, a grating depth >2000 nm and <3000 nm and a grating duty cycle of >0.5 and <0.8.

One novelty of the present invention is the combination of the various components into a single device. The transmission grating design on its own is novel as there are no publications or prior art found for the present specifications.

Figure 1:
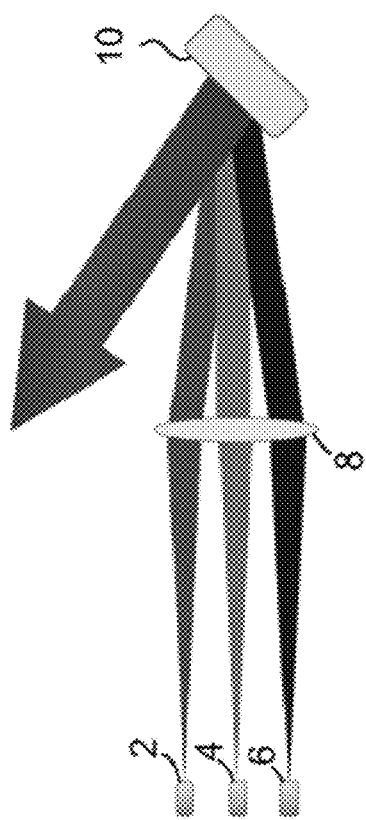
FIG. 1 illustrates prior art spectral beam combining achieved when beams with non-overlapping optical spectra are combined by wavelength-sensitive beam combiners such as a reflection grating.
Figure 3:
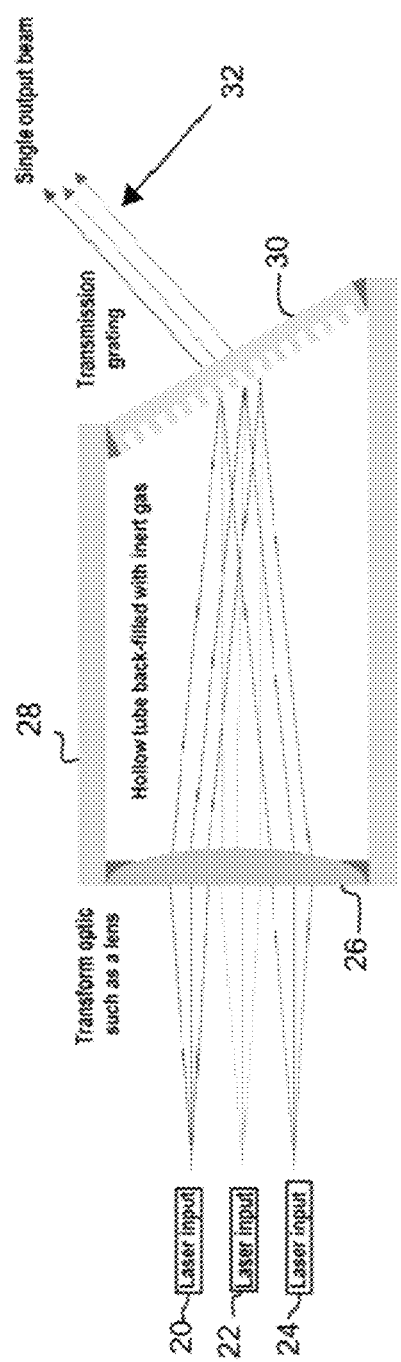
FIG. 3 is a general depiction of the present invention.
Figure 4A:
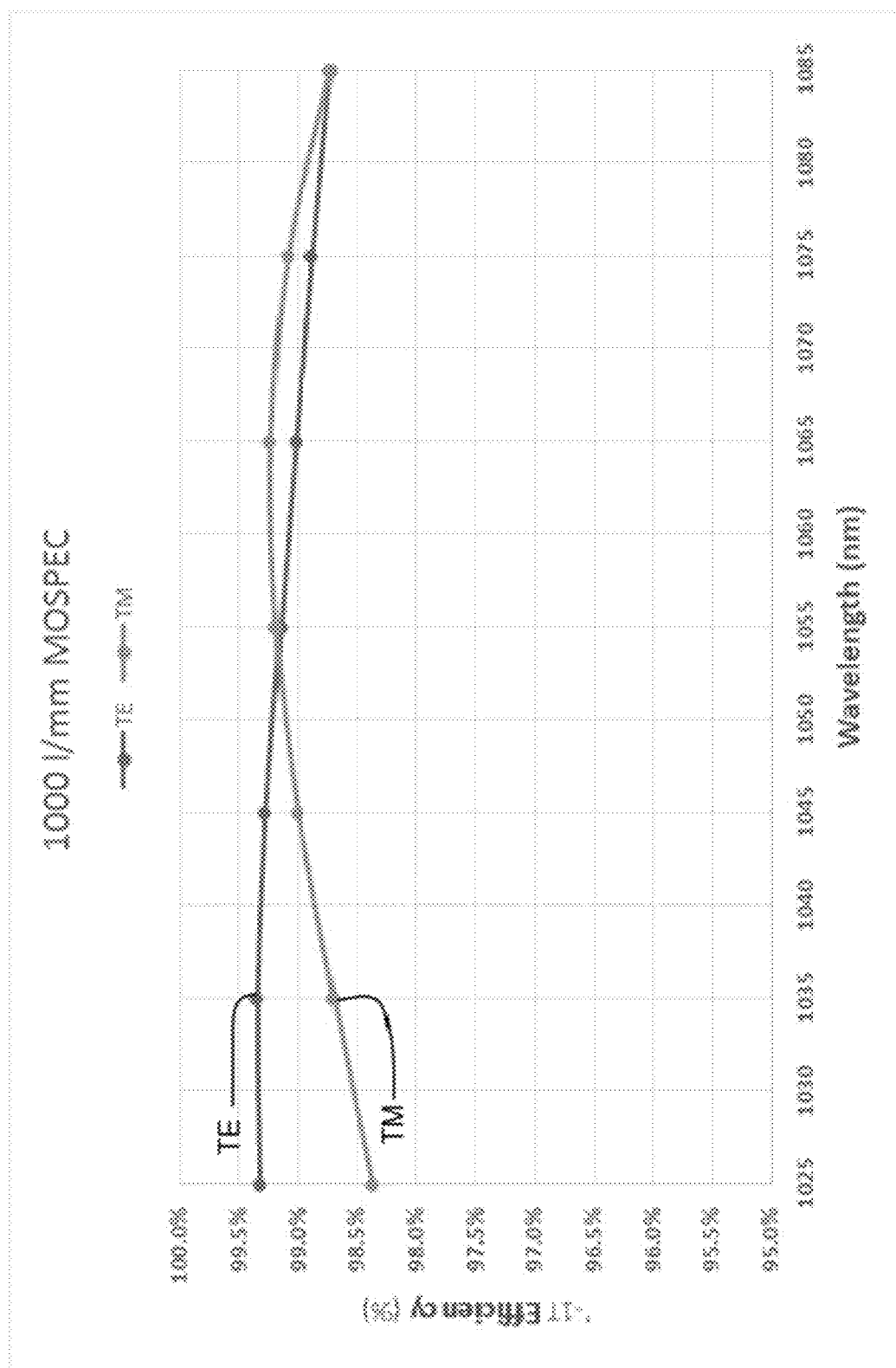
FIGS. 4A-D describe the specifications for a transmission grating design useable as part of the present invention.
Figure 4B:
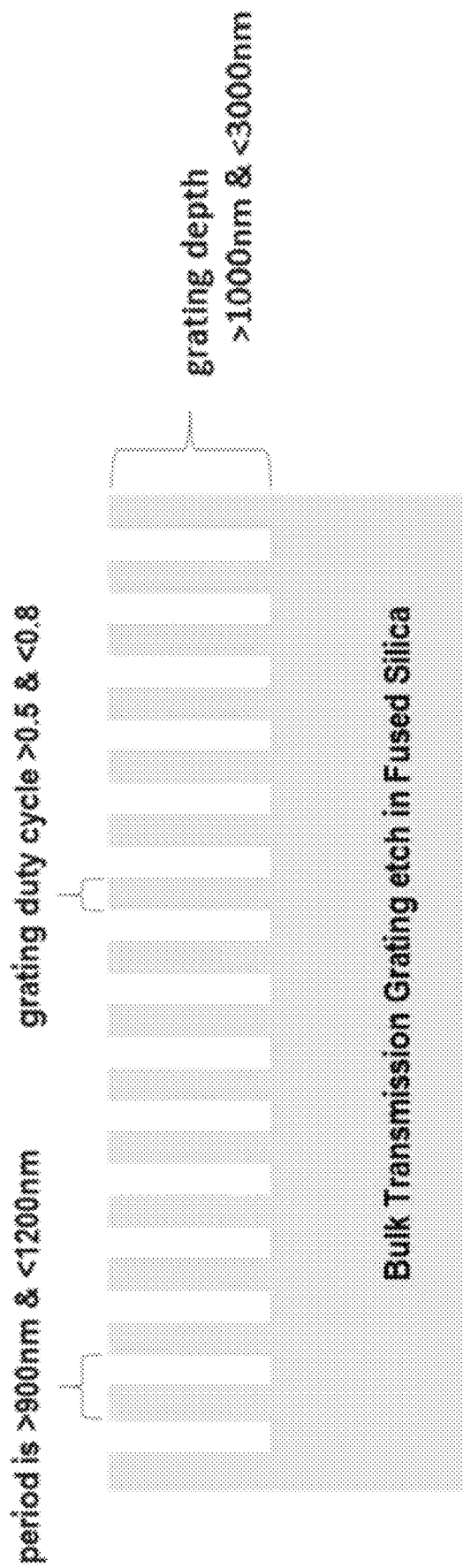
Figure 4C:
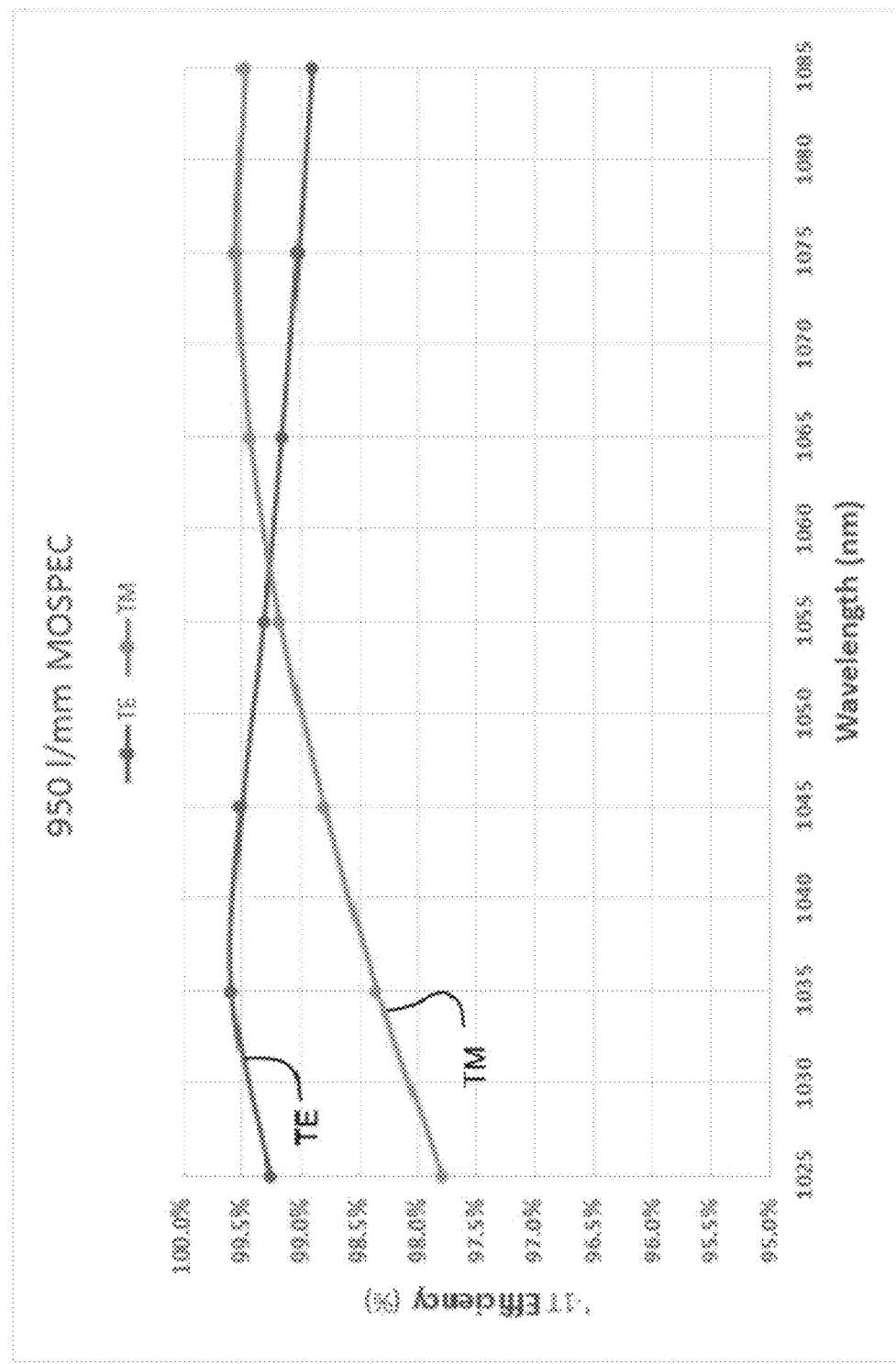
Figure 4D:
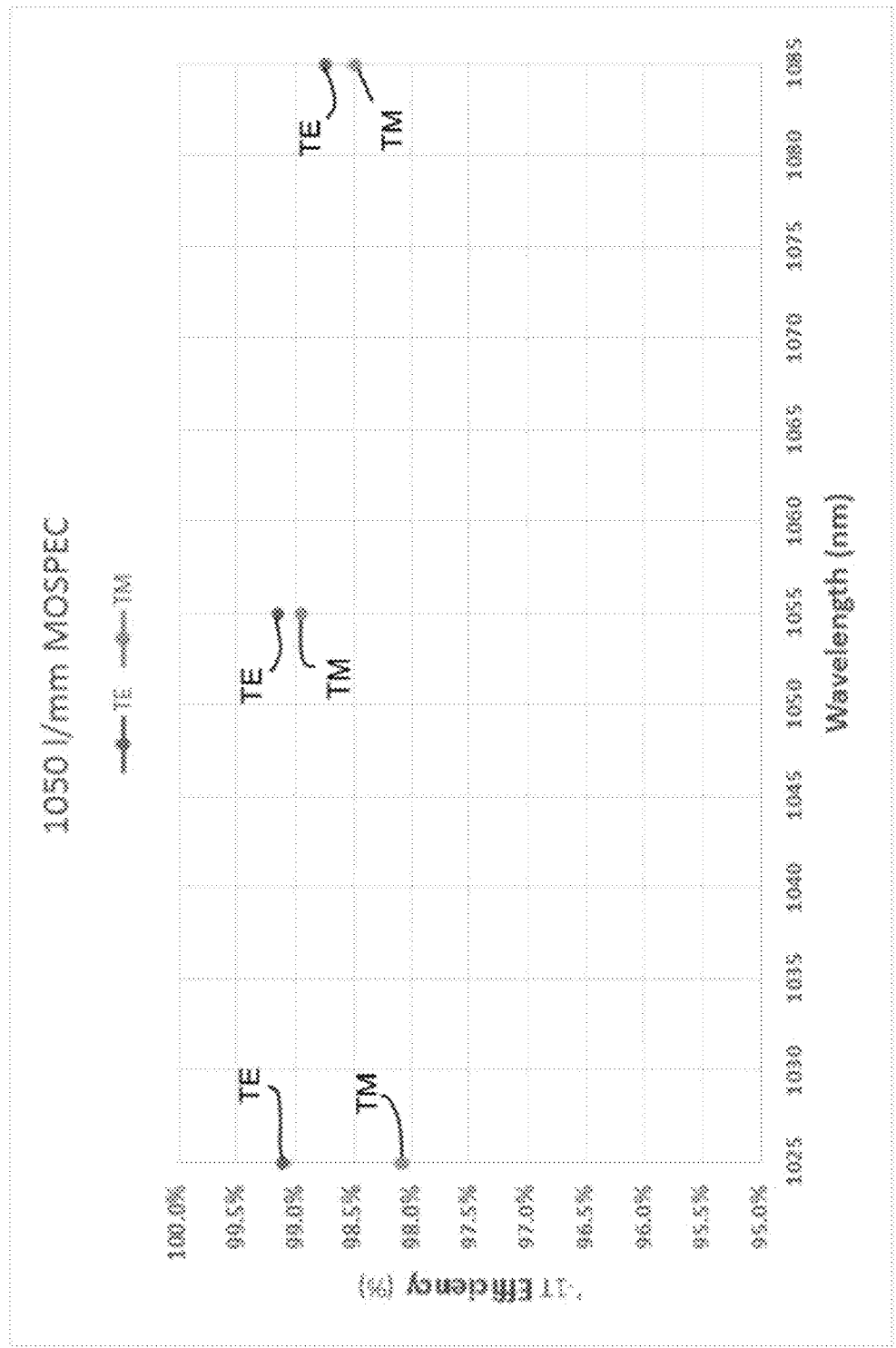

FIG. 3 is a general depiction of the present invention. It shows laser inputs 20, 22, 24 directed onto a transform optic 26 which directs the beams through a hollow assembly 28, such as a tube that is back filled with an inert gas in one embodiment, so that the beams are overlapped on transmission grating 30 from with a single output beams 32 propagates.

FIGS. 4A-D describe the specifications for a transmission grating design useable as part of the present invention. This grating is novel. The inventors have not found any publications or prior art found for the present specifications. The wavelength range: 1025 nm to 1085 nm, the transmitted diffraction efficiency: >98% before AR, the polarization: polarization insensitive, the material: must be in bulk fused silica for highest laser damage threshold. The grating structure details are grating period: >900 nm and <1200 nm, the grating duty cycle: >0.5 and <0.8 and the grating depth: >1000 nm and <3000 nm.

Note, that the designs specified herein for the optical components (lenses and grating) are novel alternatives to existing SBC technology. The current existing SBC laser systems are limited to a wavelength range from approximately 1030 nm to 1080 nm due to availability of high-power fiber lasers. Those skilled in the art will understand that the present invention can be designed to accommodate other wavelength ranges that will be available in the future.

Figure 5:
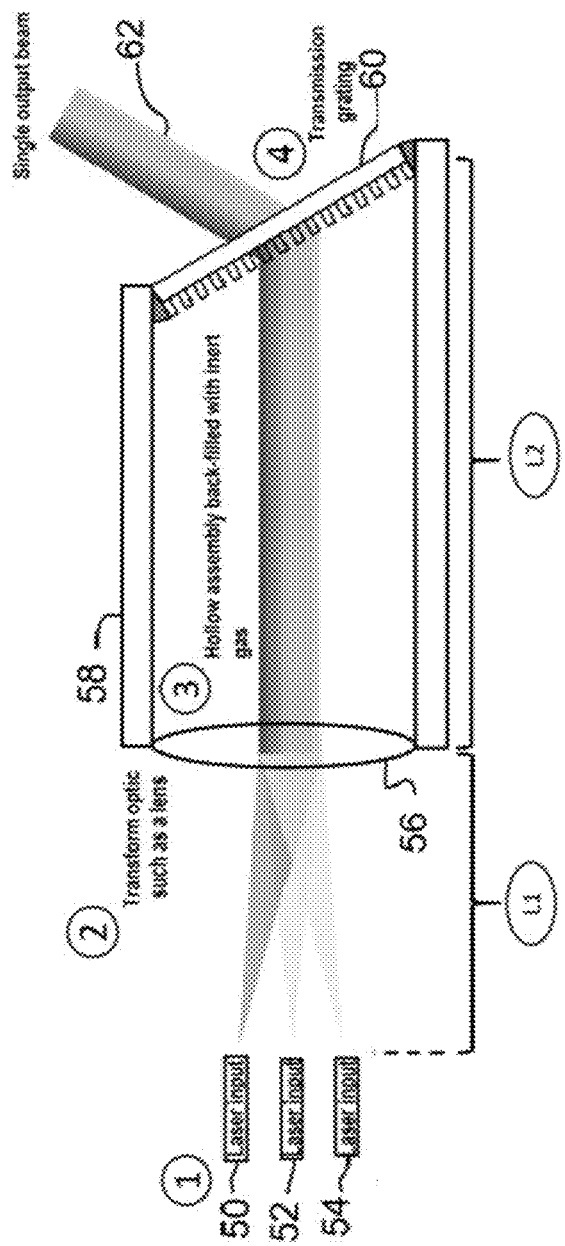
FIG. 5 illustrates an embodiment where the laser beams are spatially overlapped at the transform optic and the transmission grating.

FIG. 5 illustrates an embodiment where the laser beams are spatially overlapped at the transform optic and the transmission grating. Advantage is that all of the optical components (transform optic, transmission grating, monolithic structure can be made smaller). The figure shows laser inputs 50, 52 and 54 directing beams to overlap on transform optic 56 and to pass through hollow assembly 58. The beams overlap on grating 60 from which an output beam 62 propagates. The laser inputs can be individual lasers, laser fibers, or emitter. Beam diameters on optic is shown to be 40 mm diameter, $1/e^2$. The transform optic can be aspheric lens, plano-convex, Fresnel lens, reflective mirrors. The transform optic is shown to be 100 mm diameter. The hollow assembly can be cylindrical or square, can be made from highly conductive material such as silicon or silicon carbide or non-absorbing material such as fused silica, can be back filled with (i) argon for intensities above Raman and SBS thresholds and Raleigh scatter reduction and (ii) nitrogen/oxygen mixture if below Raman and SBS thresholds and Raleigh scatter is no concern, can be vacuum to compensate for various pressures. The transmission grating is fabricated from bulk fused silica material for either polarization sensitive or insensitive for wavelengths from 1025 nm to 1085 nm with theoretical diffraction efficiency >99%. The grating parameters are period is >900 nm and <1200 nm, grating depth >2000 nm and <3000 nm, and grating duty cycle >0.5 and <0.8. The transmission grating is shown to be 127 nm diameter, beam diameters on optic is shown to be 40 mm diameter, $1/e^2$. The transform optic and transmission grating to be sealed onto the hollow assembly via glass fitting or diffusion bonding to minimize environmental contamination (no critical surfaces are expose to external environment). The out facing surfaces of the transform optic and transmission grating to utilize bulk microstructure features or thin film coating to minimize Fresnel reflection losses. The focal length of the lens to accommodate fiber spacing for quantity 20 fibers, L1=400 mm; for quantity 100 fibers, L1=2000 mm. The L2 distance shown to be 228 mm but distance is not optically critical; distance can be minimized for assembly purposes as laser beams exiting transform optic are collimated.

Figure 6:
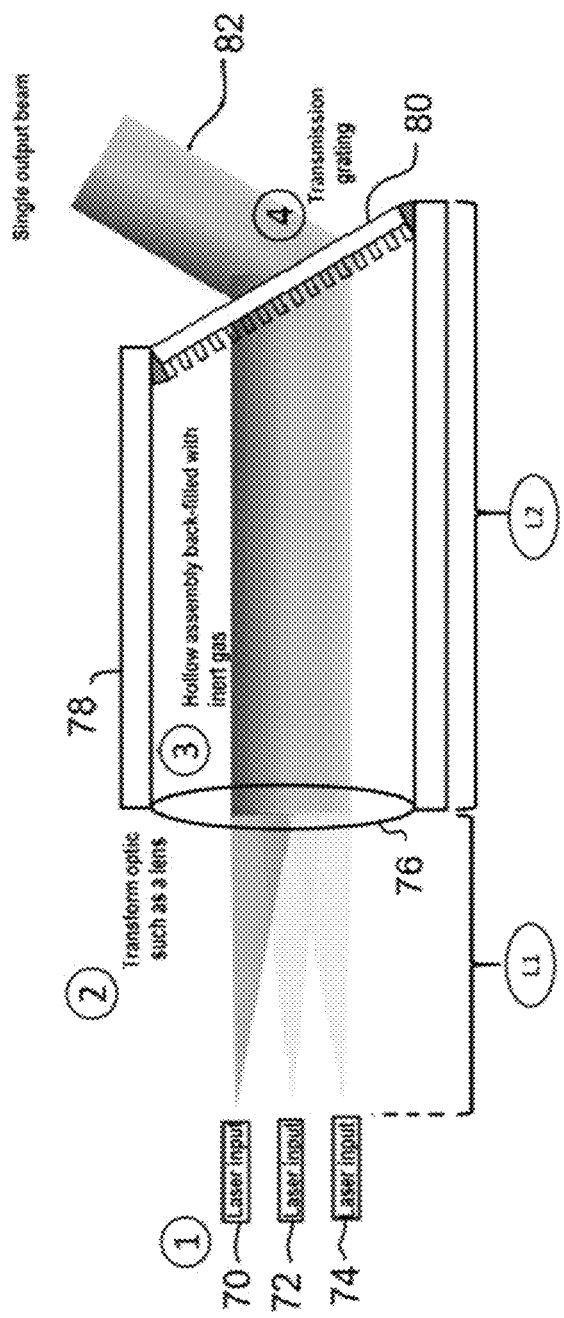
FIG. 6 shows an embodiment in which laser beams are spatially not overlapped at the transform optic and the transmission grating.
Figure 7:
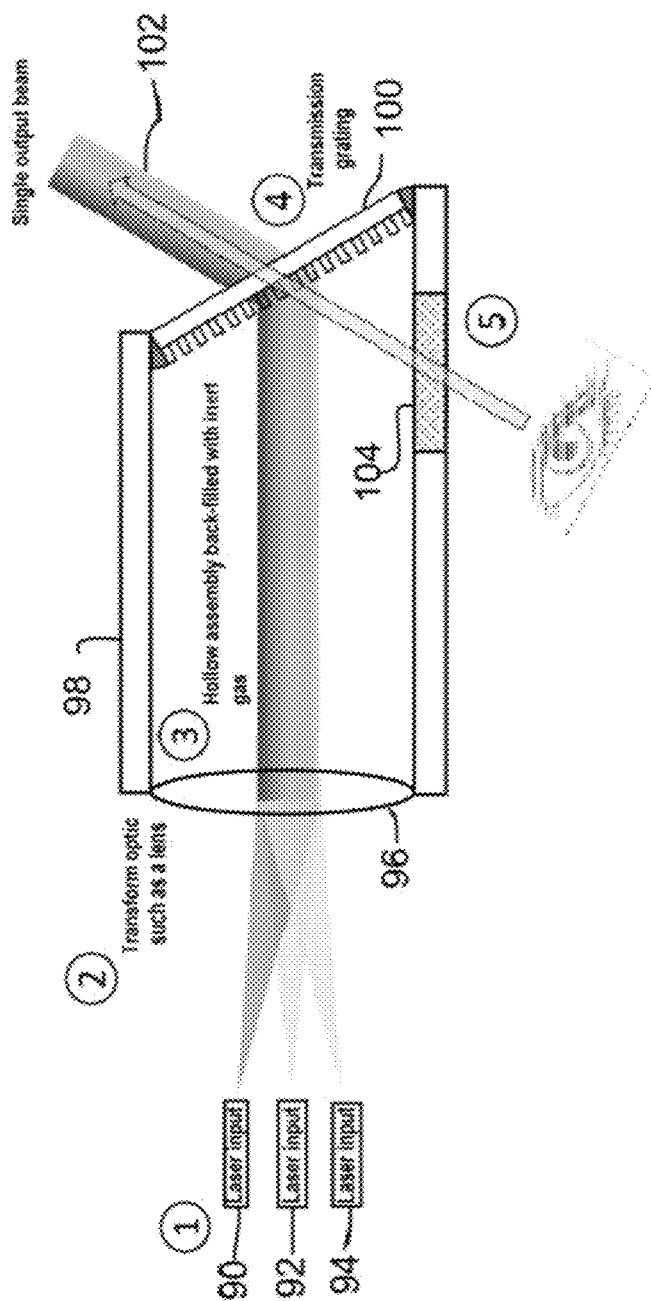
FIG. 7 shows a device with an assembly having colinear line of sight that can be used for tracking and imaging.

FIG. 6 shows an embodiment in which laser beams are spatially not overlapped at the transform optic and the transmission grating. The figure shows laser inputs 70, 72 and 74 directing beams to not overlap on transform optic 76 and to pass through hollow assembly 78. The beams do not overlap on grating 80 from which an output beam 82 propagates. An advantage is that by separating the laser beams spatially, the total laser irradiance is reduced allowing for higher power handling. Laser inputs can be individual lasers, laser fibers, or emitters. The beam diameters on the optic is shown to be 40 mm diameter, $1/e^2$. The transform optic can be aspheric lens, piano-convex, Fresnel lens or reflective mirrors. The transform optic is shown to be 100 nm diameter. The hollow assembly can be cylindrical or square, can be made from highly conductive material such as silicon or silicon carbide or non-absorbing material such as fused silica, can be back filled with argon, nitrogen/oxygen mixture and can be under vacuum to compensate for various pressures. The transmission grating is to be fabricated from bulk fused silica material for either polarization sensitive or insensitive for wavelengths from 1025 nm to 1085 nm with theoretical diffraction efficiency >99%. Grating parameters are period is >900 nm and <1200 nm, grating depth >2000 nm and <3000 nm, and grating duty cycle >0.5 & <0.8. The transmission grating is shown to be 127 mm diameter, beam diameters on optic is shown to be 40 mm diameter, $1/e^2$. The transform optic and transmission grating can be sealed onto the hollow assembly via a glass fitting or by diffusion bonding to minimize environmental contamination (no critical surfaces are expose to external environment). The out facing surfaces of the transform optic and transmission grating utilize bulk microstructure features or thin film coating to minimize Fresnel reflection losses. The focal length of lens to accommodate fiber spacing for quantity 20 fibers, L1=400 mm; for quantity 100 fibers, L1=2000 mm. The distance shown to be 228 mm. Distance is not optically critical. The distance can be minimized for assembly purposes as laser beams exiting transform optic are collimated FIG. 7 shows a device with an assembly having colinear line of sight that can be used for tracking and imaging. The figure shows laser inputs 90, 92 and 94 directing beams to overlap on transform optic 96 and to pass through hollow assembly 98. The beams do overlap on grating 100 from which an output beam 102 propagates. This configuration is not possible with the reflection grating configuration. A transmissive "see-through" optic or window 104 allows for a line of sight that is colinear with the combined laser outputs and could be used for tracking and imaging purposes.

Embodiments have been described that can be utilized for spectrally combining multi lasers or laser emitters into a single high-power beam. The device generally consists of a monolithic structure, such as a hollow tube, where in the input end cap consist of a transform optic and the output end cap consist of a transmission grating.

Below are variations of the invention that can be utilized to solve other spectral combing challenges.

1. By integrating two separate transmitting spectral beam combiner devices in a specific orientation, the source linewidth and wavelength drift can be compensated for in a spectrally combined beam system.

2. Embodiments of the device allow for a two-dimensional array of input laser sources and that the sources' orthogonally overlapped beam paths will be spectrally combined to form parallel output beams.

Spectral beam combining (SBC) laser systems design requires precisely defined and maintained optical paths and that wavelength and bandwidth be maintained for optimum overlapping of each source's wavelengths in order to achieve maximized peak focal Strehl. Current state-of-the-art SBC laser systems allow a maximum 10-15 GHz Gaussian spectra linewidth and sub GHz spectra shift.

An embodiment here is a compensation method that allows spectral shifts and increased linewidths up to hundreds of GHz. The benefit is that a wider spectral linewidth reduces the previously required narrow bandwidths of spectrally high intensities. Wider incoherent spectrum beams are less susceptible to optics system materials damage by non-linear affects like SBS. This in turn allows for increased laser power amplification, resulting in significantly higher output power from the laser. This compensation method utilizes two separate transmitting spectral beam combiner devices integrated in a specific orientation.

Figure 8:
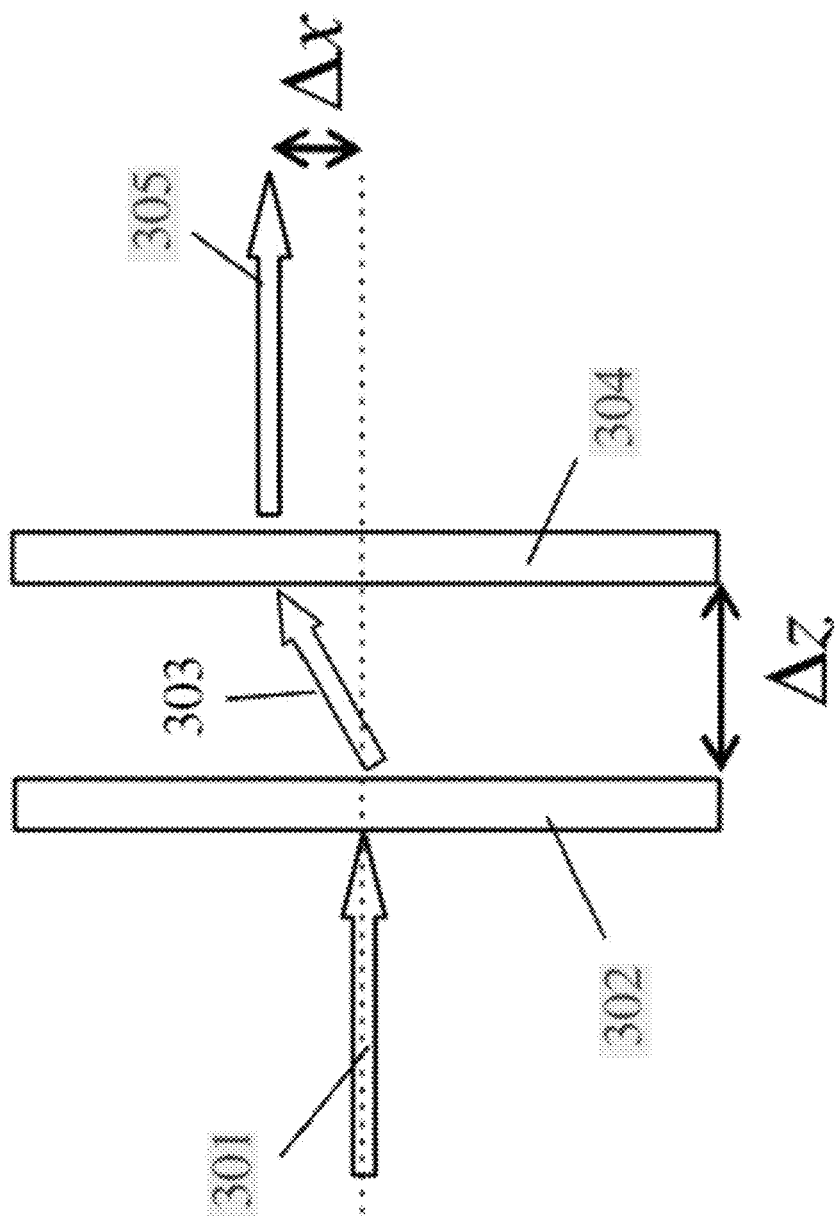
FIG. 8 illustrates an achromatic pointing optical design that uses two parallel diffraction gratings in opposite diffraction orders.
Figure 9:
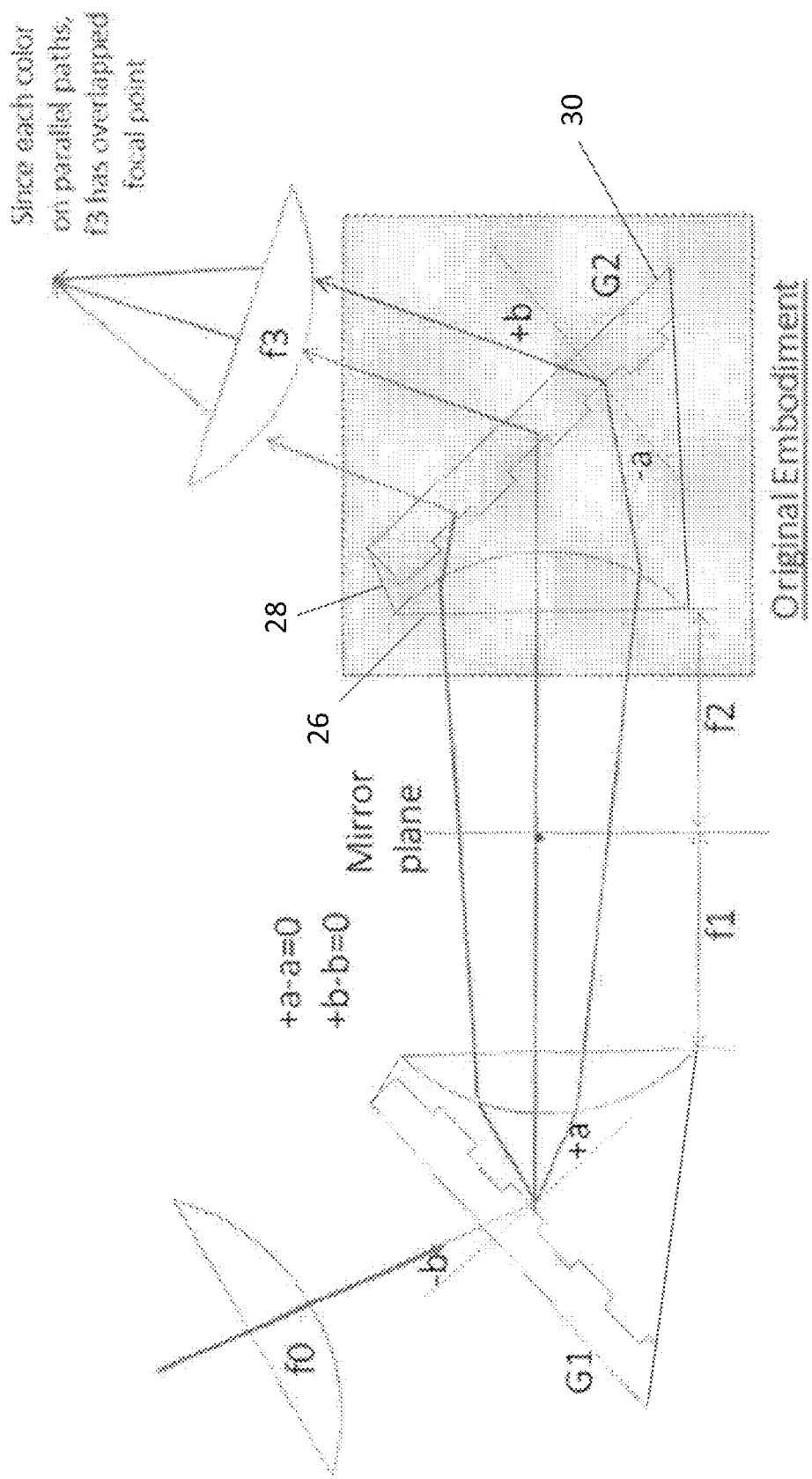
FIG. 9 illustrates an embodiment where two separate transmitting spectral beam combiner devices are integrated in a specific orientation to compensate for the degradation of the focal Strehl resulting from the grating dispersion as a function of the spectra linewidth of the source and wavelength drift.

An illustration of the required specific orientation is shown in FIG. 8, where the achromatic pointing optical design uses two parallel diffraction gratings in opposite diffraction orders. For a spectral beam combining system, each grating is placed in the collimated beam paths of a Fourier or 4F optical system as shown in FIG. 9. FIG. 8, which is taken from US20110188120A1 "Broadband optics for manipulating light beams and images", indicates that path 301 is parallel to path 305 when 304 and 302 are identical line density transmission diffraction gratings that are parallel. Each grating has an opposite sign diffraction order to accomplish the angle of incidence at 303 to 304 and exitance 302 to 303 compensation where delta X will vary with wavelength and delta Z.

FIG. 9 shows exaggerated beam central ray path angles for clarity. Grating equation angles measured relative to each grating normal +a is counter clockwise and –a is clockwise. Similarly, angle –b ray path input has dispersed color paths on grating G1 that each arrive exiting the G2 at angle +b, making these rays parallel and that they can be focused by f3 to overlap. The optics and paths on the left side of the mirror plane can be on the right side of the mirror plane if a mirror is placed on the mirror plane and the conditions stated above continue to apply. Current system practice has colored rays spread of about 1 mm at the mirror plane for supporting 200 GHz line widths, leaving about 20 GHz for spectral line center drift and f3 focal Strehl=1 independent of spectrum center and bandwidth.

The "Mirror plane" shown in FIG. 9 represents the exit plane (or location) of the fiber array output composed of different wavelengths, typically ranging from 1030 nm to 1080 nm for SBC laser systems. To provide robustness and compactness, the fiber arrays are mechanically fixed in position, precluding their movement, which does not allow the fiber locations to be adjusted to compensate for spectra wavelength shifts. Thus, in current SBC laser systems, each fiber's wavelength needs to be actively locked and controlled to compensate for environmental changes to the wavelength. The present invention provides passive compensation for the spectra wavelength shift, solving the need for the active control.

Figure 10:
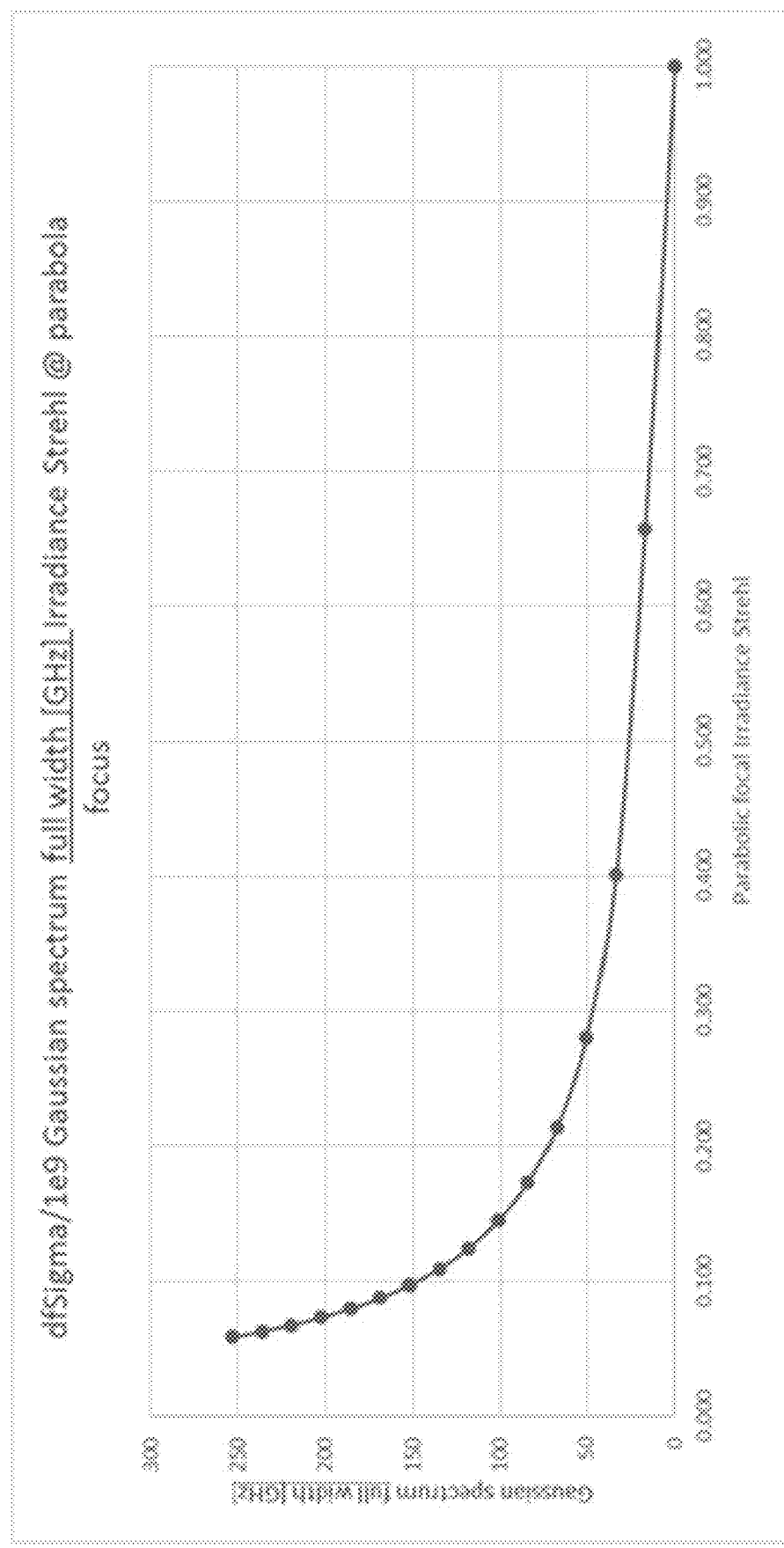
FIG. 10 is a plot of simulation results showing the effects of grating dispersion on focal Strehl as a function of spectra linewidth of the laser source.

Due to the dispersion properties of the SBC grating optics, the linewidths of current fiber laser sources utilized in SBC systems are limited to 10-15 GHz. Increased linewidth results in degradation of the laser's focused beam quality or focal Strehl as shown in FIG. 10, which is a plot of simulation results showing the effects of grating dispersion on focal Strehl as a function of spectra linewidth of the laser source. Simulations were performed using 1000 lines/mm grating optic.

Figure 11:
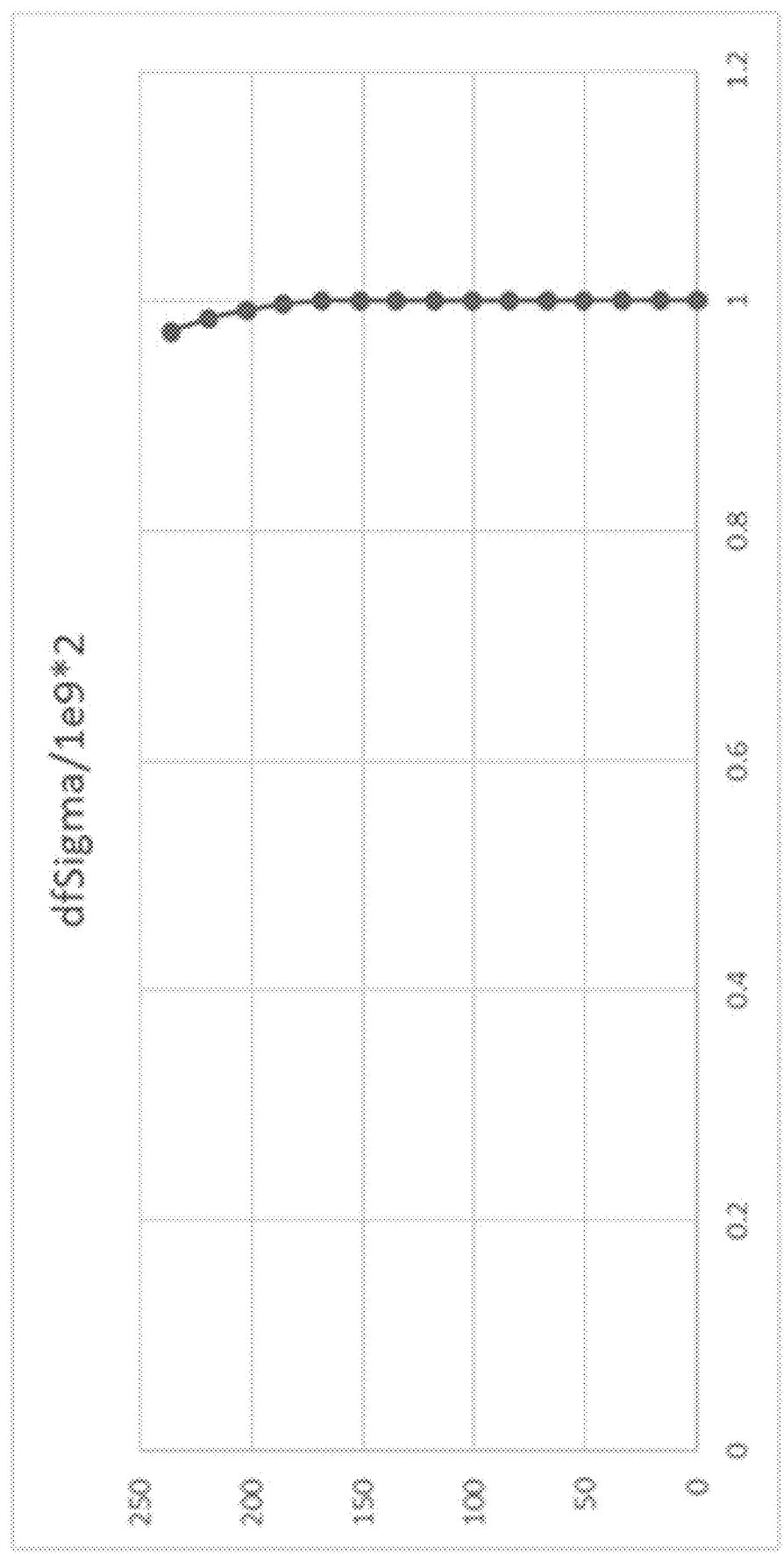
FIG. 11 is a plot from simulation results for the present invention showing compensation of grating dispersion on focal Strehl as a function of spectra linewidth of the laser source.

FIG. 11 is a plot from simulation results for the present invention showing compensation of grating dispersion on focal Strehl as a function of spectra linewidth of the laser source. Simulations were performed using a 1000 lines/mm grating optic.

Current SBC systems that require 10-15 GHz spectra linewidth also limit output laser power from the individual laser sources. The narrow linewidths translate into higher laser intensity resulting in higher probability for laser damage. A significant added benefit of the spectra linewidth of the present invention is that the spectral linewidth can be greatly increased without sacrificing beam quality and focal Strehl. Increasing the spectra linewidth reduces the laser previously required narrow spectrum intensity proportionally from the same fiber. Now with wider spectrum emitted from fiber can increase until again coherent nonlinear effects that damage the system again limit output powers.

Figure 12:
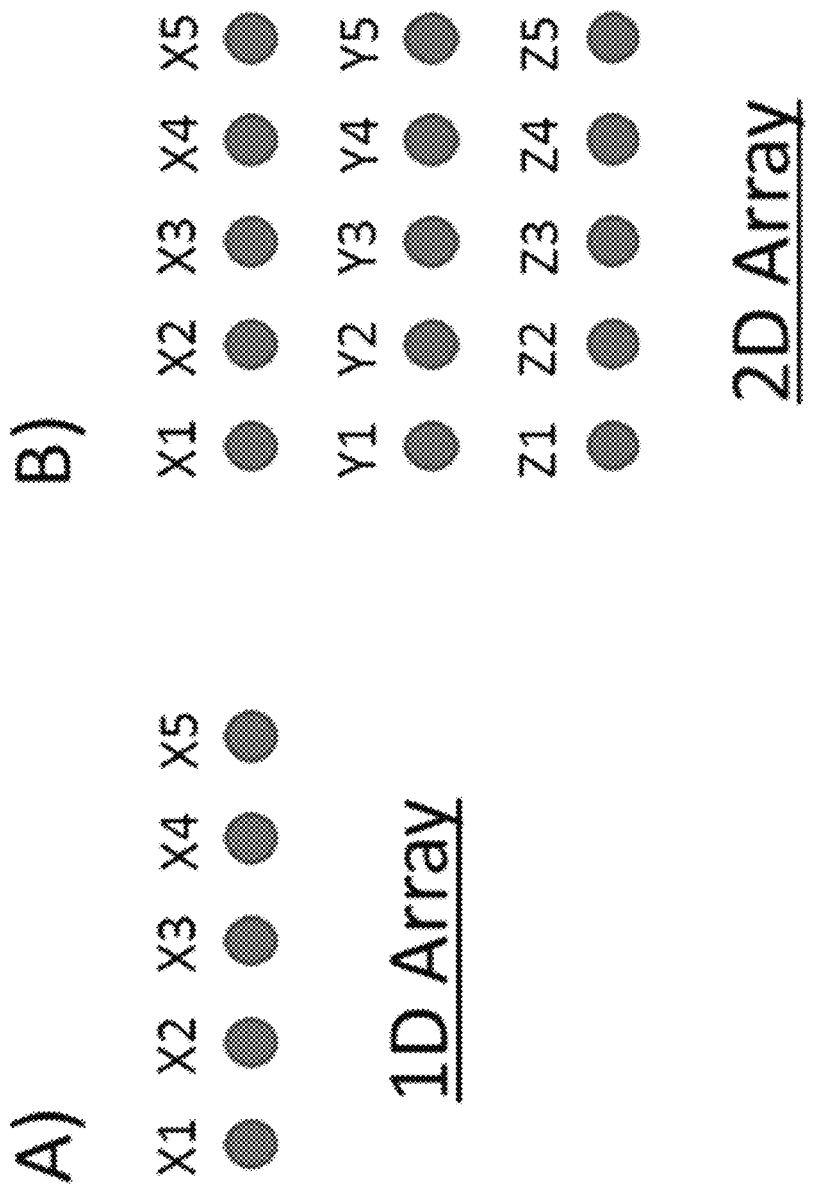
FIG. 12 is an illustration showing an example of a one-dimensional versus two-dimensional array.

Embodiments of the present invention allow for a two-dimensional (2D) array of input laser sources in which the sources' orthogonally overlapped beam paths will be spectrally combined in parallel output beams. FIG. 12 is an illustration showing an example of a one-dimensional versus two-dimensional array.

Figure 13:
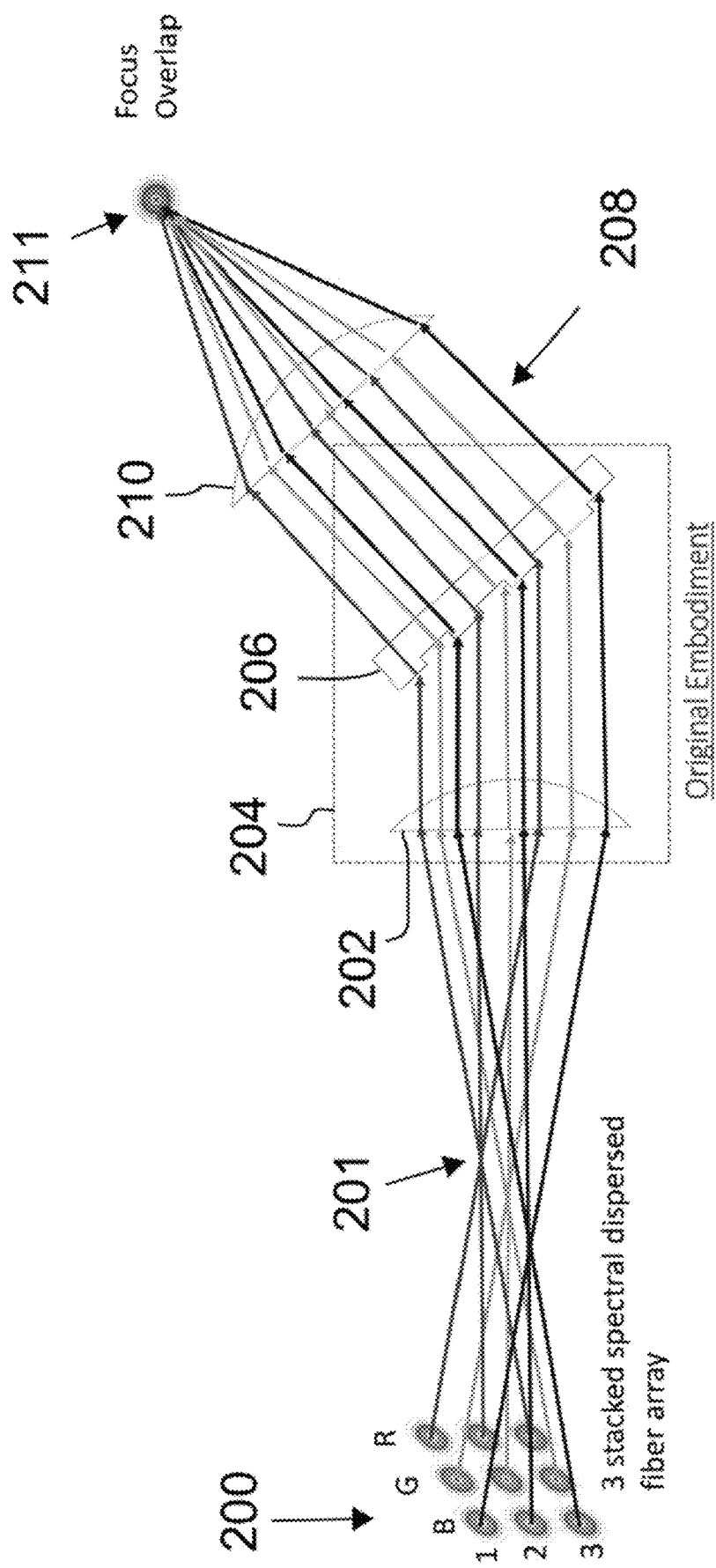
FIG. 13 is an illustration showing a two-dimensional (2D) array of input laser sources and that the sources' orthogonally overlapped beam paths will be spectrally combined to form parallel output beams.

FIG. 13 is an illustration showing a two-dimensional (2D) array of input laser sources and that the sources' orthogonally overlapped beam paths will be spectrally combined to form parallel output beams. The figure shows a 2-dimensional array of laser beam inputs 200 directed onto transform optic 202 which can be part of assembly 204. The beams pass through hollow assembly 204 and overlap on grating 206 from which an output beam 208 propagates which is then focused by lens 210. Sacked laser modes 200 aimed to a common wavelength focused overlap 201, are spectrally spatially dispersed as wavelength RGB. Each stacked wavelengths RBG are collimated leaving lens 202. Spectral spatial dispersion RGB and 1,2,3 stacks are parallel exiting grating 206 in region 208. Lens 210 focuses collimated colinear beams and wavelengths to common focus overlap 211.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A transmitting spectral beam combiner (SBC), comprising:
   a hollow structure having an input end and an output end;
   a first transform optic fixedly attached to seal said input end; and
   a first transmission grating fixedly attached to seal said output end,
   wherein an internal area of said hollow structure is sealed,
   wherein said grating comprises a first periodic structure located within said internal area, and
   wherein out facing surfaces of said first transform optic and said first transmission grating utilize bulk microstructures or a thin film coating to minimize Fresnel reflection losses.

2. The SBC of claim 1, wherein said hollow structure is selected from the group consisting of a hollow tube, a hollow cylinder and a hollow square.

3. The SBC of claim 1, wherein said first transmission grating consists essentially of bulk fused silica material.

4. The SBC of claim 1, wherein said hollow structure comprises highly conductive material.

5. The SBC of claim 4, wherein said highly conductive material is selected from the group consisting of silicon and silicon carbide.

6. The SBC of claim 1, wherein said hollow structure comprises a non-absorbing material.

7. The SBC of claim 6, wherein said non-absorbing material comprises fused silica.

8. The SBC of claim 1, wherein said first transform optic is selected from the group consisting of an aspheric lens, a plano-convex lens and a Fresnel lens.

9. The SBC of claim 1, wherein said first transmission grating is polarization insensitive for wavelengths from 1025 nm to 1085 nm with a theoretical transmitted diffraction efficiency >99%.

10. The SBC of claim 9, wherein said first transmission grating has a period >900 nm and <1200 nm, a grating depth >1000 nm and <3000 nm and a grating duty cycle of >0.5 and <0.8.

11. The SBC of claim 1, wherein said first periodic structure has no thin film.

12. The SBC of claim 1, wherein said internal area comprises an inert gas.

13. The SBC of claim 1, wherein said internal area comprises one of argon or a nitrogen/oxygen mixture.

14. The SBC of claim 1, wherein said internal area is under vacuum to compensate for various pressures.

15. The SBC of claim 1, wherein said hollow structure includes a see-through window that allows for a line of sight that is colinear with combined laser outputs.

16. The SBC of claim 1, further comprising means for directing an input array of beams onto said first transform optic, wherein said input array of beams is selected from the group consisting of a one-dimensional array of beams and a two-dimensional array of beams.

17. A method, comprising:
   providing the SBC of claim 1; and directing a plurality of beams having different wavelengths so that they overlap on said first transform optic, overlap on said first transmission grating and produce a single output beam.

18. The method of claim 17, wherein said plurality of beams is configured as one of a one-dimensional array or a two-dimensional array.

19. A method, comprising:
providing the SBC of claim 1; and
directing a plurality of beams having different wavelengths so that they do not overlap on said first transform optic, do not overlap on said first transmission grating and produce a single parallelly aligned wavelengths output beam.

20. The method of claim 19, wherein said plurality of beams is configured as one of a one-dimensional array or a two-dimensional array.

21. A monolithic transmitting spectral beam combiner (SBC), comprising:
a hollow structure having an input end and an output end;
a first transform optic (TO1) fixedly attached to seal said input end;
a first transmission grating (TG1) fixedly attached to seal said output end, wherein an internal area of said hollow structure is sealed, wherein said TG1 comprises a first periodic structure located within said internal area;
a second transmission grating (TG2) comprising a second periodic structure angularly facing said first periodic structure; and
a second transform optic (TO2) between said TG2 and said TO1.

22. The SBC of claim 21, wherein said TG1 and said TG2 have opposite signs.

23. The SBC of claim 21, wherein an input array of beams directed onto said TG2 at a first angle −b relative to the TG2 normal will exit said TG2 at an angle +a relative to the TG2 normal to produce an exit array of beams, wherein said TO2 will direct said exit array to said TO1 which will direct said exit array onto said TG1 at an angle −a relative to the TG1 normal, wherein said exit array will exit said TG1 to produce an output array at an angle +b relative to the TG1 normal, wherein the sum of the angles +a and −a equals zero and the sum of the angles +b and −b equals zero.

24. The SBC of claim 23, wherein said input array of beams is configured in a one-dimensional array.

25. The SBC of claim 23, wherein said input array of beams is configured in a two-dimensional array.

26. A method, comprising:
providing the apparatus of claim 23; and
directing an input array of beams onto said TG2 at a first angle −b relative to the TG2 normal.

27. The method of claim 26, wherein said plurality of beams is configured in a one-dimensional array.

28. The method of claim 26, wherein said plurality of beams is configured in a two-dimensional array.

29. The method of claim 26, wherein said input array of beams comprises different wavelengths, wherein said input array of beams is directed onto said TG2 so that they overlap on said TG2 such that said output array is a single output beam.

30. The method of claim 26, wherein said input array of beams comprises different wavelengths, wherein said input array of beams is directed onto said TG2 so that they do not overlap on said TG2 such that said output array is a single parallelly aligned wavelengths output beam.

31. The SBC of claim 21, further comprising a third transform optic (TO3), wherein said input array of beams is directed by said TO3 onto said TG2 at said first angle −b relative to the TG2 normal.

32. The SBC of claim 21, further comprising a fourth transform optic (TO4), wherein said output array is a collimated output beam, wherein said TO4 is positioned to focus said collimated output beam.

33. A transmitting spectral beam combiner (SBC), comprising:
a hollow structure having an input end and an output end;
a first transform optic fixedly attached to seal said input end; and
a first transmission grating fixedly attached to seal said output end,
wherein an internal area of said hollow structure is sealed, wherein said grating comprises a first periodic structure located within said internal area, wherein said first transmission grating is polarization insensitive for wavelengths from 1025 nm to 1085 nm with a theoretical transmitted diffraction efficiency >99%.

34. The SBC of claim 33, wherein said first transmission grating has a period >900 nm and <1200 nm, a grating depth >1000 nm and <3000 nm and a grating duty cycle of >0.5 and <0.8.

* * * * *